US009109895B2

(12) United States Patent
Chen et al.

(10) Patent No.: US 9,109,895 B2
(45) Date of Patent: Aug. 18, 2015

(54) ESTIMATING PROBABILITIES OF ARRIVAL TIMES FOR VOYAGES

(75) Inventors: Henry Chen, San Francisco, CA (US); Philip J. Ballou, Alameda, CA (US); Lang Deng, Castro Valley, CA (US); Jonathan David Elkin, Tiburon, CA (US)

(73) Assignee: THE BOEING COMPANY, Chicago, IL (US)

( * ) Notice: Subject to any disclaimer, the term of this patent is extended or adjusted under 35 U.S.C. 154(b) by 1049 days.

(21) Appl. No.: 12/432,960

(22) Filed: Apr. 30, 2009

(65) Prior Publication Data
US 2010/0280750 A1   Nov. 4, 2010

(51) Int. Cl.
*G01C 21/00* (2006.01)
*G01C 21/30* (2006.01)

(52) U.S. Cl.
CPC ...................................... *G01C 21/00* (2013.01)

(58) Field of Classification Search
CPC . B23J 2099/008; G01C 21/00; G01C 21/005; G01C 21/20; G01C 21/3691; G01C 23/00; B63B 39/00; B63B 9/08; B63H 20/08; G01V 1/3835; G08G 3/00; G08G 5/0034
See application file for complete search history.

(56) References Cited

U.S. PATENT DOCUMENTS

| | | | |
|---|---|---|---|
| 5,521,905 A * | 5/1996 | Oda et al. ....................... | 370/232 |
| 6,317,686 B1 * | 11/2001 | Ran ............................... | 701/533 |
| 6,615,133 B2 * | 9/2003 | Boies et al. .................... | 701/209 |
| 6,658,349 B2 * | 12/2003 | Cline ............................. | 701/517 |
| 7,129,857 B1 * | 10/2006 | Spirkovska .................... | 340/971 |
| 7,289,039 B2 * | 10/2007 | Kato et al. ..................... | 340/905 |
| 7,463,973 B2 * | 12/2008 | Okude et al. .................. | 701/202 |
| 7,546,206 B1 * | 6/2009 | Miller et al. .................. | 701/415 |
| 7,885,401 B1 * | 2/2011 | Mullen .................... | 379/265.05 |
| 7,898,438 B2 * | 3/2011 | Brosius, III .............. | 340/995.27 |
| 8,024,111 B1 * | 9/2011 | Meadows et al. ............. | 701/414 |

(Continued)

FOREIGN PATENT DOCUMENTS

WO    WO 9831586 A1 *  7/1998   .............. B63B 49/00

OTHER PUBLICATIONS https://web.archive.org/web/20070502051731/http://www.oceanweather.com/software/.*

(Continued)

*Primary Examiner* — Florian Zeender
*Assistant Examiner* — Dana Amsdell
(74) *Attorney, Agent, or Firm* — Yee & Associates, P.C.

(57) ABSTRACT

A method, apparatus, and computer program product are present for generating a route for a ship. A start point and an end point are identified for the ship. A number of forecasts of weather conditions is obtained for a period of time to travel from the start point to the end point. A probability of reaching the end point from the start point is generated for a number of routes from the start point to the end point for the ship within the period of time using the number of forecasts of weather conditions to form a number of probabilities.

22 Claims, 10 Drawing Sheets

(56) References Cited

U.S. PATENT DOCUMENTS

| | | | |
|---|---|---|---|
| 8,121,749 B1* | 2/2012 | Agrawal et al. | 701/23 |
| 8,296,065 B2* | 10/2012 | Haynie et al. | 701/505 |
| 8,606,517 B1* | 12/2013 | Ehrlacher et al. | 701/465 |
| 9,002,721 B2* | 4/2015 | Hughes | 705/7.15 |
| 2002/0009978 A1* | 1/2002 | Dukach et al. | 455/99 |
| 2002/0169527 A1* | 11/2002 | Cline | 701/21 |
| 2003/0012083 A1* | 1/2003 | Brunet | 367/19 |
| 2004/0088107 A1* | 5/2004 | Seligmann | 701/204 |
| 2004/0193367 A1* | 9/2004 | Cline | 701/207 |
| 2006/0224318 A1* | 10/2006 | Wilson et al. | 701/213 |
| 2006/0241862 A1* | 10/2006 | Ichihara et al. | 701/209 |
| 2007/0100538 A1* | 5/2007 | Wise et al. | 701/200 |
| 2008/0255757 A1* | 10/2008 | Bruce et al. | 701/202 |

OTHER PUBLICATIONS https://web.archive.org/web/20070424184028/http://www.oceanweather.com/forecast/VOSS/index.html.*

"Vessel and Voyage Optimization Services", Jeppesen Marine, 2008. pp. 1-4.

"Vessel Optimization and Safety System—VOSS", pp. 1-2, retrieved Apr. 2009 www.ocean-systems.com.

* cited by examiner

ESTIMATING PROBABILITIES OF ARRIVAL TIMES FOR VOYAGES

BACKGROUND INFORMATION

1. Field

The present disclosure relates generally to ship operations and, in particular, to a method and apparatus for generating routes for ships. Still more particularly, the present disclosure relates to a method and apparatus for analyzing probabilities of a ship arriving at a destination at a specified time.

2. Background

Commercial ships carry cargo, goods, passengers, and/or materials from one port to another. Commercial ships may include, for example, tankers, bulk carriers, container vessels, and passenger vessels. Globally, tens of thousands of ships make voyages over the seas from one port to another port. A typical cargo ship may make anywhere from around 10 to 30 voyages per year. Often, at any one time, around 1,000 to 3,000 commercial vessels are at sea.

Issues may occur when a ship arrives at a destination later than scheduled. For example, the availability of a planned berth and a port may be missed. As a result, the ship may have to wait additional time for another berth. Further, scheduling of dockside labor facilities also may be disrupted by a ship arriving at a destination later than scheduled. Connections may be missed and/or delivery of products to a vendor may be delayed. These types of issues may increase costs in transporting cargo on a ship.

Further, these delays also may disrupt other operations that occur in transporting products. For example, other transportation systems that may transport the products after the products arrive at a port include trucking, rail, and air transportation services. Delays may disrupt the planning of these types of transportation. Further, storage costs also may increase as a result of delays. When a ship has to wait at a port, increased fuel costs and increased emissions also occur.

By increasing the speed of a ship to arrive early, the ship may still have to wait for a scheduled berth at a port. Further, fuel efficiency may be decreased by the increased speed and early arrival. In some cases, the ship may arrive on time but may require bursts of speed that may also reduce fuel efficiency. These situations also increase the costs needed to make a voyage.

In making a voyage, it is desirable to make the voyage in a manner that enhances safety, efficiency, and/or lower fuel consumption. Weather forecasts, historical data, charts, and optimization software applications are currently used to generate routes to meet these and/or other goals with respect to a ship making a voyage.

Weather forecasts, however, may decrease in accuracy for forecasts that are farther out. For example, with a 10-day weather forecast, only the first two to three days may be reasonably reliable. The actual weather conditions may fluctuate with the longer forecasts. These fluctuations may be more prevalent with winter and/or stormy conditions.

With these situations, operators of ships cope with the changing conditions with little help from the original planned route. In some situations, the provider of the route may provide updated plans during the voyage to take into account changing conditions.

Therefore, it would be advantageous to have a method and apparatus that addresses one or more of the issues discussed above, as well as possibly other issues.

SUMMARY

In one advantageous embodiment, a method is present for generating a route for a ship. A start point and an end point are identified for the ship. A number of forecasts of weather conditions is obtained for a period of time to travel from the start point to the end point. A probability of reaching the end point from the start point is generated for a number of routes from the start point to the end point for the ship within the period of time using the number of forecasts of weather conditions to form a number of probabilities.

In another advantageous embodiment, an apparatus comprises a computer recordable storage device, a program code stored on the computer recordable storage medium, and a processor unit capable of executing the program code. The processor unit is capable of executing the program code to identify a start point and an end point for a ship, obtain a number of forecasts of weather conditions for a period of time to travel from the start point to the end point, and generate a probability of reaching the end point from the start point for a number of routes from the start point to the end point for the ship within the period of time using the number of forecasts of weather conditions to form a number of probabilities.

In yet another advantageous embodiment, a computer program product for generating a route for a ship comprises a computer recordable storage medium and program code stored on the computer recordable storage medium. Program code is present for identifying a start point and an end point for the ship. Program code is also present for obtaining a number of forecasts of weather conditions for a period of time to travel from the start point to the end point. Further, program code is present for generating a probability of reaching the end point from the start point for a number of routes from the start point to the end point for the ship within the period of time using the number of forecasts of weather conditions to form a number of probabilities.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
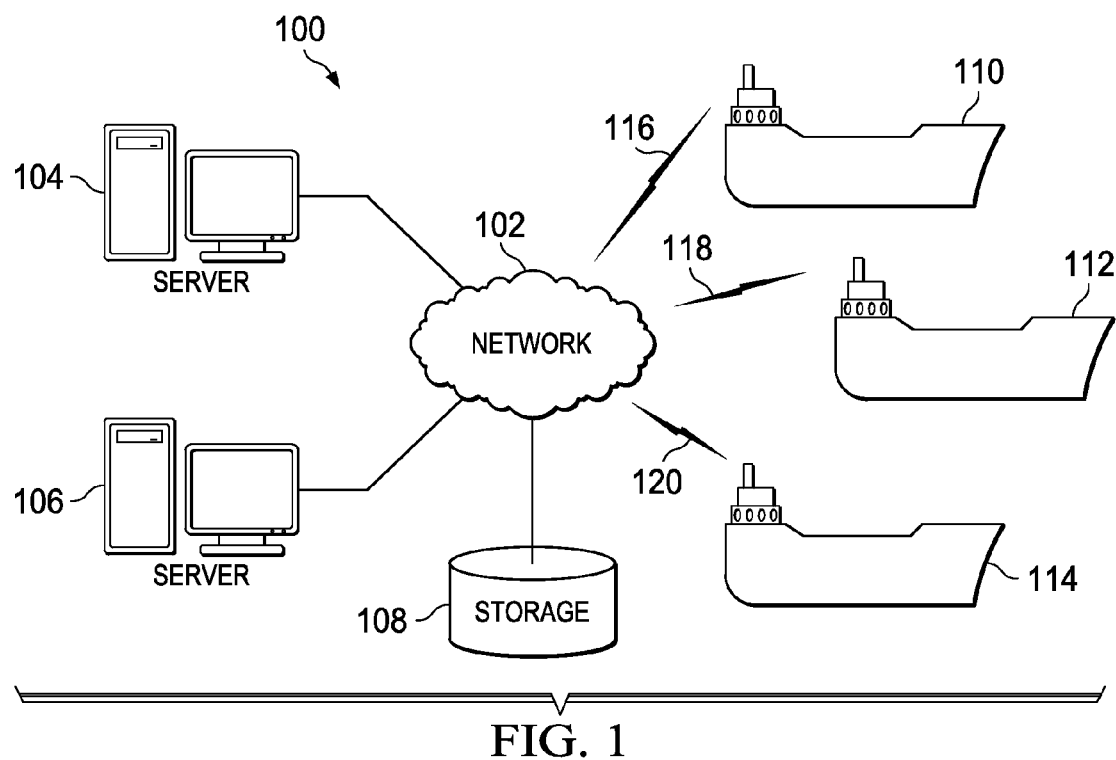
FIG. 1 is a pictorial representation of a network of data processing systems in which advantageous embodiments may be implemented.

FIG. 1 depicts a pictorial representation of a network of data processing systems in which advantageous embodiments may be implemented. Network data processing system 100 is a network of computers in which the advantageous embodiments may be implemented. Network data processing system 100 contains network 102. This network is the medium used to provide communications links between various devices and computers connected together within network data processing system 100. Network 102 may include connections, such as wired, wireless communications links, or fiber optic cables.

In the depicted examples, server 104 and server 106 are connected to network 102 along with storage unit 108. In addition, clients 110, 112, and 114 connect to network 102. In these illustrative examples, clients 110, 112, and 114 connect to network 102 through wireless communications links 116, 118, and 120.

These wireless communications links may be through radio frequency signals. Additionally, the wireless communications links may be established through satellites within network 102. Clients 110, 112, and 114, in these examples, are data processing systems located on ships. In these advantageous embodiments, ships are watercraft such as, for example, without limitation, tankers, bulk carriers, container vessels, passenger ships, and/or other suitable types of watercraft.

Storage unit 108 also connects to network 102 and provides data and other information. For example, storage unit 108 may contain databases. In the depicted examples, servers 104 and 106 provide data in programs to clients 110, 112, and 114. Network data processing system 100 may include additional servers, clients, and other devices not shown.

In this illustrative example, network data processing system 100 may include different types of networks, such as an Internet, a local area network (LAN), and a wide area network (WAN). In particular, network 102 may include the Internet or a satellite communications network. FIG. 1 is intended as an example, and not as an architectural limitation for the different advantageous embodiments.

Figure 2:
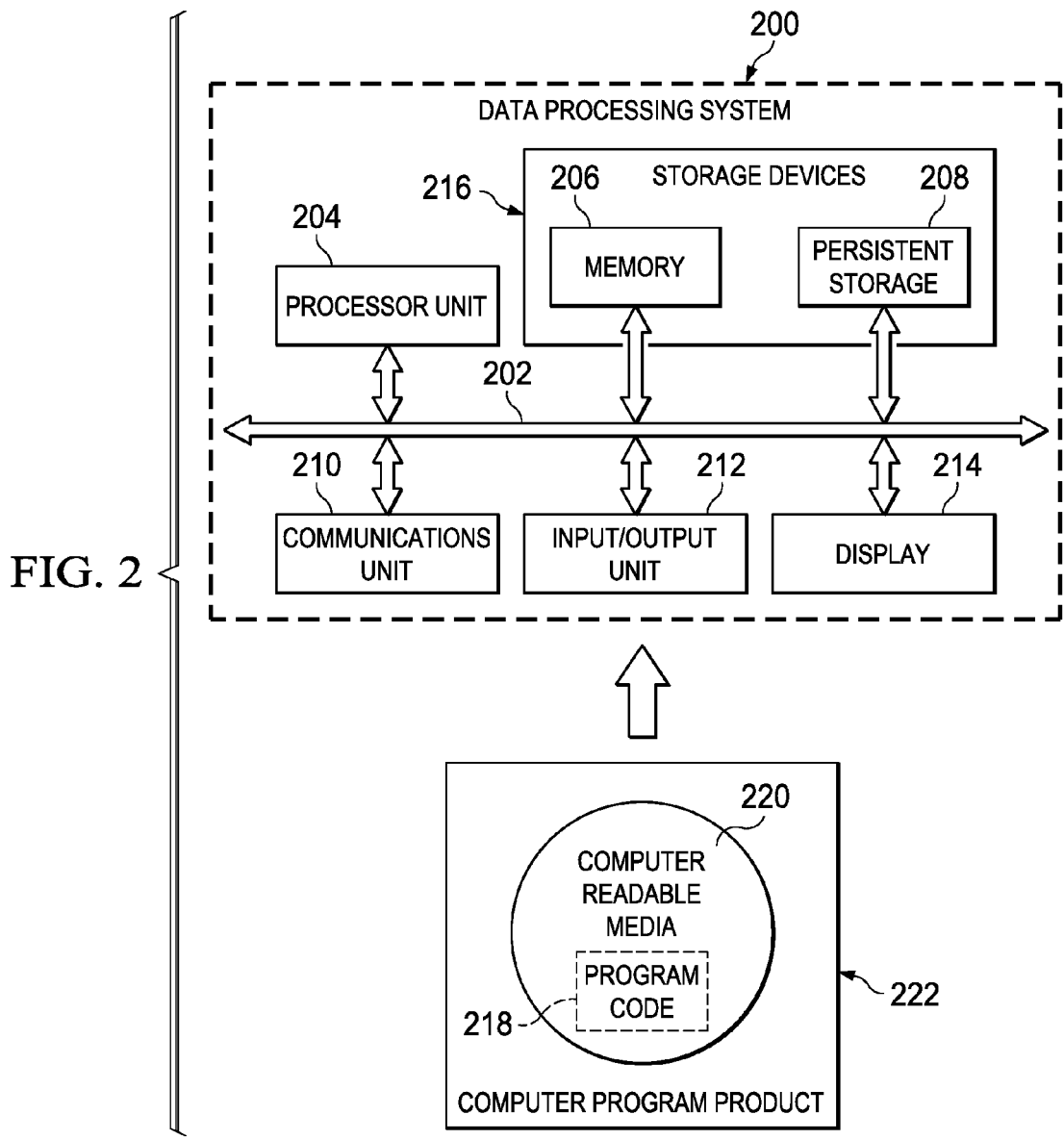
FIG. 2 is a diagram of a data processing system in accordance with an advantageous embodiment.

Turning now to FIG. 2, a diagram of a data processing system is depicted in accordance with an advantageous embodiment. Data processing system 200 is an example of a data processing system that may be used to implement computers, such as server 104, server 106, client 110, client 112, and client 114 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information such as, for example, without limitation, data, program code in functional form, and/or other suitable information either on a temporary basis and/or a permanent basis.

Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to an operator.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form such as, for example, an optical or magnetic disk that is inserted or placed into a drive or other device that is part of persistent storage 208 for transfer onto a storage device, such as a hard drive that is part of persistent storage 208.

In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize and take into account a number of considerations. For example, the different advantageous embodiments recognize and take into account that currently available routing processes for generating routes for ships rely on input, such as weather, wave, tide, current, and wind forecasts. These forecasts for weather, waves, tides, currents, and winds comprise an ensemble weather forecast.

The different advantageous embodiments also recognize and take into account that an operator may choose to perform the routing process again during a voyage. For example, the forecasts of weather conditions, waves, and tides decrease in reliability as the forecasts are farther out in time. An operator may choose to perform the routing process again at various intervals of time during the voyage to increase the reliability of the forecasts of weather conditions, waves, and tides. The increased reliability of these forecasts may increase the probability that the ship will arrive at the destination on time.

Further, the different advantageous embodiments recognize that this type of process may result in increased fuel costs. For example, an operator may determine that an increased probability of reaching a destination on time may be provided by taking a different route than the current route. Changing the current route to the different route may result in increased fuel costs.

The different advantageous embodiments also recognize and take into account that it would be desirable to estimate the probability that a vessel will be able to arrive at a destination at a desired time. Knowing this probability allows an operator to determine how much headroom or leeway is possible in case of unexpected changes or problems along the route of the voyage.

The different advantageous embodiments recognize and take into account that knowing these probabilities would allow an operator to select a route from a number of different routes that may be presented for the voyage. Thus, the different advantageous embodiments provide a method and apparatus for generating routes for a ship.

In generating the route, a start point and an end point are identified for the ship. A forecast of weather conditions, tide conditions, current conditions, and/or wave predictions for a period of time to travel from a start point to the end point is obtained. A probability of reaching the end point from the start point for a number of routes from the start point to the end point for the ship within the period of time is generated using the forecast of weather conditions to form a number of probabilities.

Figure 3:
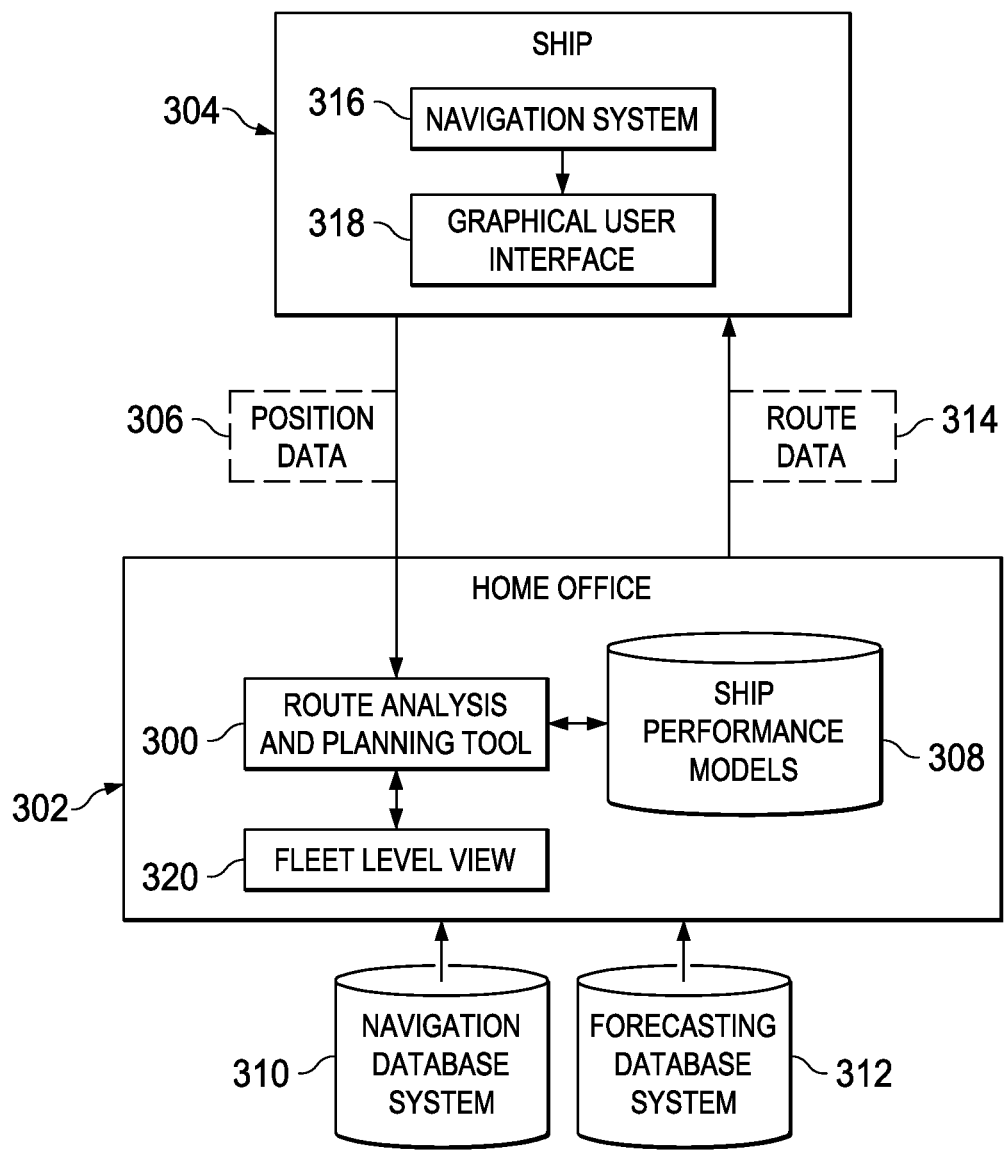
FIG. 3 is a diagram illustrating components for generating routes in accordance with an advantageous embodiment.

With reference now to FIG. 3, a diagram illustrating components for generating routes is depicted in accordance with an advantageous embodiment. In these illustrative examples, route analysis and planning tool 300 is an example of a software component, such as a program or application containing a routing process, and is located at home office 302. Route analysis and planning tool 300 is a program or application designed to plan routes for vessels to optimize time to reach desired destinations using conditions, such as forecasts of weather conditions, waves, tides, currents, winds, and/or other conditions.

In these examples, the route is optimized to reach a destination with an optimal travel time. Of course, other embodiments may include other goals, such as reducing the cost to travel from a start point to an end point. Further, another goal for optimization that may be realized by the route is to reduce fuel cost. Of course, other goals alone or in combination with these and others may be taken into account by route analysis and planning tool 300. In these examples, the optimization of a route to meet a goal, such as travel time, indicates that travel time may be reduced, but not necessarily result in the fastest travel time.

In these illustrative examples, route analysis and planning tool 300 is located at home office 302. Home office 302, in these examples, is a location at which management of a fleet of ships may occur. Although these examples illustrate performing routing using route analysis and planning tool 300 at home office 302, the routing process and tools may be located in other places. For example, route analysis and planning tool 300 may be located on board ship 304. In an embodiment when route analysis and planning tool 300 is located on ship 304, this tool may be used to provide routes just for ship 304. Alternatively, ship 304 may serve as a location to provide routing for other ships.

In these examples, ship 304 is an example of a vessel managed by home office 302. Ship 304 transmits position data 306 to route analysis and planning tool 300. Position data 306 includes a location of ship 304. This data may be obtained through a global positioning system on ship 304. The position information also may include a velocity or speed of ship 304. This information is used by route analysis and planning tool 300 to identify the location of ship 304 in determining whether changes in the route of ship 304 may be suggested.

Route analysis and planning tool 300 uses ship performance models 308 in determining whether various conditions that are present and forecasted may affect ship 304 in its route to a destination. The same weather conditions at sea affect different types of ships in different ways. Route analysis and planning tool 300 also uses navigation information from navigation database system 310 and forecasting information from forecasting database system 312.

The navigation information includes various types of information such as, for example, tides and currents for different locations on the seas, the location of traffic lanes, the location of ports, the location of lights and buoys, and the location of obstructions in shallow water. These types of data are examples of data that may be located in navigation database system 310, but are not an exhaustive list of examples.

Forecasting information may include, for example, current and predicted weather conditions, winds, and wave data. This list of examples of forecasting data available in forecasting database system 312 also is an exemplary list. Navigation database system 310 and forecasting database system 312 may be found at a single location or may be distributed through different locations depending on the particular implementation.

Information in forecasting database system 312 may be obtained from multiple sources. For example, the information can be obtained from National Centers for Environmental Prediction in the United States, the European Centre for Medium-Range Weather Forecasts (ECMWF), the United Kingdom Met Office, Meteo France, Environment Canada, the Japanese Meteorological Agency, the Bureau of Meteorology in Australia, the Chinese Meteorological Agency, the Korean Meteorological Agency, and CPTEC in Brazil.

Route analysis and planning tool 300 uses this information along with the performance model for ship 304 to plan a route from the current location of ship 304 to its destination. This routing analysis is performed in response to events that occur in the advantageous embodiments. These events may be periodic events, such as performing analysis every hour or every five hours to determine whether changes in routing may be suggested.

Alternatively, the routing analysis may be performed in response to an event, such as a request from ship 304 or a change in current or predicted weather conditions. Route analysis and planning tool 300 generates a route for ship 304 based on the navigation information, forecasting information, and the ship performance model. This route is sent as route data 314 to ship 304.

When received, route data 314 is processed by navigation system 316. Navigation system 316 is an example of software that may be executed on a data processing system, such as data processing system 200 in FIG. 2, on ship 304. Navigation system 316 presents a route on graphical user interface 318.

In the different advantageous embodiments, navigation system 316 may propose multiple routes. These routes also may include an identification of probabilities of reaching an end point on time for each of these routes. In these examples, an end point is reached on time if a ship is capable of reaching the end point at or before the desired time. The time, in these examples, may include a date. Further, the time may be more granular and include a date and time of day.

In response, a captain or other operator on ship 304 may determine whether to use the suggested route. With the different advantageous embodiments, the captain or other operator of ship 304 may make a more informed choice by having the probabilities of arriving on time for each of the proposed routes. Graphical user interface 318 may be used to change the route of ship 304 in these examples.

Route analysis and planning tool 300 may present higher probabilities for reaching the end point using a route that may not be the shortest or usual route. A longer route may have a higher probability of reaching an end point on time as compared to a shorter route.

For example, the shorter route may take ship 304 into waters having significant waves and head winds, which may damage the vessel or cargo that the vessel is carrying. In contrast, the longer routes may have a higher probability of reaching the destination on time, because the longer route avoids unfavorable weather conditions, undesired wave heights, headwinds, or other undesirable conditions.

Additionally, route analysis and planning tool 300 may be used to generate new routes or reroute the ship during a voyage in a manner that minimizes the time and cost of the voyage. The rerouting may be near real time, depending on how fast data in forecasting database system 312 is updated.

Further, the number of routes generated by route analysis and planning tool 300 may be displayed on fleet level view 320, which is a graphical user interface that provides a display of the routes for different vessels in the fleet managed by home office 302.

With route analysis and planning tool 300, operators of ships may make more informed choices by having information on probabilities of reaching destinations associated with proposed routes for ship 304. In addition to taking into account the probability of arriving on time, route analysis and planning tool 300 also may take into account other factors. For example, decreasing travel time may increase costs due to fuel consumption factors for various vessels.

As a result, some of the routes generated by route analysis and planning tool 300 may actually be slower than the fastest possible time to a destination. These routes may reach the end point on time, but in a manner that reduces the cost for transporting the cargo based on fuel costs. Of course, other factors and goals may be taken into account in addition to or in place of the ones depicted.

With these types of considerations, route analysis and planning tool 300 may provide a number of different routes that may be selected for a voyage in which probabilities of arriving on time are presented with those routes. Route analysis and planning tool 300 may be executed on a data processing system, such as data processing system 200 in FIG. 2, in home office 302.

Figure 4:
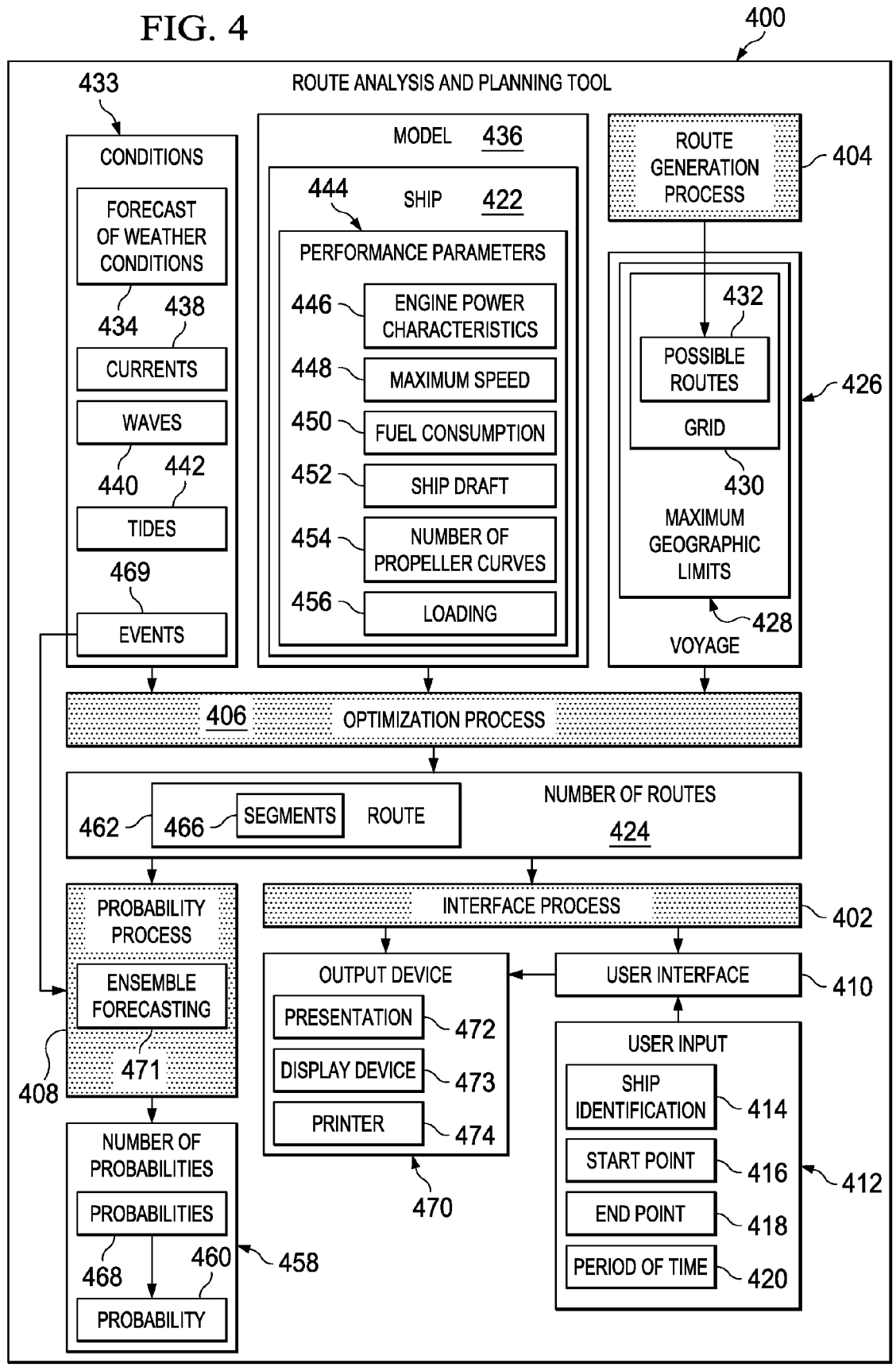
FIG. 4 is a diagram illustrating processes in a route analysis and planning tool in accordance with an advantageous embodiment.

Turning now to FIG. 4, a diagram illustrating processes in a route analysis and planning tool is depicted in accordance with an advantageous embodiment. In this illustrative example, route analysis and planning tool 400 is an example of one implementation of route analysis and planning tool 300 in FIG. 3.

In this illustrative example, route analysis and planning tool 400 includes interface process 402, route generation process 404, and probability process 408. Interface process 402 generates user interface 410. User interface 410 may be, for example, a graphical user interface. User interface 410 may be used to receive user input 412. In these examples, user input 412 includes at least one of ship identification 414, start point 416, end point 418, period of time 420, and/or other suitable types of input. This information is used to generate number of routes 424 for voyage 426 for ship 422.

Ship identification 414 is used to identify ship 422. Start point 416 identifies a beginning point for number of routes 424 and voyage 426. End point 418 identifies a destination for number of routes 424 in voyage 426. Period of time 420 identifies the period of time for travelling from start point 416 to end point 418. Period of time 420 may take different forms. For example, period of time 420 may be a start date and an end date. In other examples, period of time 420 may be a number of hours, a number of days, or some other measurement of time.

User input 412 may be entered by an operator, selected from a graphical user interface, and/or other types of input. The operator may be, for example, a ship captain, a user at a home office, or some other person. In some advantageous embodiments, a portion or all of user input 412 may be generated by a device. For example, start point 416 may be identified using a global positioning system that identifies a current location of ship 422.

In these examples, number of routes 424 is generated by route generation process 404. Route generation process 404 identifies possible routes 432 between start point 416 and end point 418 to identify number of routes 424. Number of routes 424 is identified from possible routes 432 using route generation process 404. Route generation process 404 identifies maximum geographic limits 428 for voyage 426. Maximum geographic limits 428 identify the different areas that ship 422 can travel to from start point 416 to end point 418.

Thereafter, route generation process 404 divides maximum geographic limits 428 into grid 430 containing possible routes 432. Optimization process 406 identifies number of routes 424 from possible routes 432 in these illustrative examples. Number of routes 424 is one or more routes through which ship 422 is capable of travelling from start point 416 to end point 418 during period of time 420.

In identifying number of routes 424, optimization process 406 uses conditions 433. Conditions 433, in these examples, include, for example, without limitation, forecast of weather conditions 434 for period of time 420 and model 436 of ship 422. Further, optimization process 406 also may consider forecasts of other types of conditions 433, for example, without limitation, currents 438, waves 440, tides 442, and/or other conditions that may be forecasted as being present during period of time 420.

Model 436 may include various parameters about ship 422. Model 436 is an example of a model that may be found in ship performance models 308 in FIG. 3. Model 436 includes performance parameters 444. Performance parameters 444 may include, for example, without limitation, engine power characteristics 446, maximum speed 448, fuel consumption 450, ship draft 452, number of propeller curves 454, loading 456 of ship 422, and/or other suitable parameters that may affect the performance of ship 422.

In these illustrative examples, probability process 408 generates number of probabilities 458 for number of routes 424.

In these illustrative examples, each route within number of routes 424 is associated with a probability in number of probabilities 458. Number of probabilities 458 may be generated for the entire route.

For example, probability process 408 may identify probability 460 for route 462 in number of routes 424. The identification of probability 460 may be identified by dividing route 462 into segments 466. Probability process 408 then identifies probabilities 468 for segments 466. Probabilities 468 are then combined to form probability 460 in these illustrative examples. The combining of probabilities 468, in this example, is performed by multiplying probabilities 468 to each other. Of course, any other manner for combining probabilities may be used.

In these illustrative examples, probabilities 468 may be based on probabilities of events 469 occurring at a particular time for each segment in segments 466. In these illustrative examples, the probability of an event within events 469 occurring may be less when that event is farther out in time as compared to an event that is closer in time.

Of course, other factors may be used in addition to or in place of the probability of events 469. For example, without limitation, how close ship 422 is to maximum speed 448 may be used to identify probabilities 468 for number of routes 424. As ship 422 plans to travel closer to maximum speed 448, the probability of ship 422 reaching end point 418 decreases. Conditions 433, such as waves 440, may cause ship 422 to be unable to reach maximum speed 448. The reduction may be such that ship 422 is unable to travel at the speed needed to reach end point 418 on time.

The identification of probabilities 468 from events 469 may be made in a number of different ways. In these illustrative examples, probabilities 468 for events 469 may be obtained using ensemble forecasting 471.

In these illustrative examples, ensemble forecasting 471 includes calculating a probability based on a number of forecasts for a number of conditions 433. In other words, an ensemble weather forecast may include weather forecasts, as well as forecasts of waves, tides, winds, currents, and/or other suitable phenomena. Ensemble forecasting 471 is used to identify a probability in probabilities 468 for each segment in segments 466. As a result, an operator may see the probability of each segment in segments 466 being completed, as well as all of route 462.

In these examples, a probability within probabilities 468 for a segment in segments 466 may be lower due to extreme or highly variable weather conditions. Additionally, low probabilities also may result from approaching the maximum performance and safe operating limits for a ship. In this manner, probability process 408 provides a capability to evaluate each segment in segments 466 for route 462, as well as the probability of all of route 462.

For example, a segment in segments 466 of route 462 may be altered during planning of a voyage or during the actual voyage. The segment may be altered by an increased speed, changing weather conditions, and/or some other suitable factors. Probability process 408 may reevaluate the altered segment to change probabilities 468 for segments 466 and probability 460.

After number of probabilities 458 and number of routes 424 have been identified, interface process 402 may present number of routes 424 and number of probabilities 458 at output device 470 as presentation 472. Output device 470 may be, for example, without limitation, display device 473, printer 474, and/or some other suitable type of output device. When presentation 472 is presented at display device 473, number of routes 424 and number of probabilities 458 may be presented through user interface 410. From presentation 472, the operator may select route 462 from number of routes 424 based on looking at number of probabilities 458.

Of course, during voyage 426, route analysis and planning tool 400 may be used to reanalyze route 462. With this type of analysis, end point 418 stays the same, while start point 416 becomes the current position of ship 422. For example, an operator of ship 422 may make changes to a segment in segments 466 of route 462 during voyage 426. These changes may change probabilities 468 and probability 460. The operator of ship 422 may have the capability to choose whether to implement those changes given the new probabilities and/or continue using route 462 in its unchanged form.

The illustration of components in FIGS. 3 and 4 are not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, probability process 408 may be implemented as part of route generation process 404. In yet other advantageous embodiments, route analysis and planning tool 400 may be distributed in different locations. As another example, in some advantageous embodiments, other types of mechanisms may be used to identify probabilities 468 other than ensemble forecasting 471.

Figure 5:
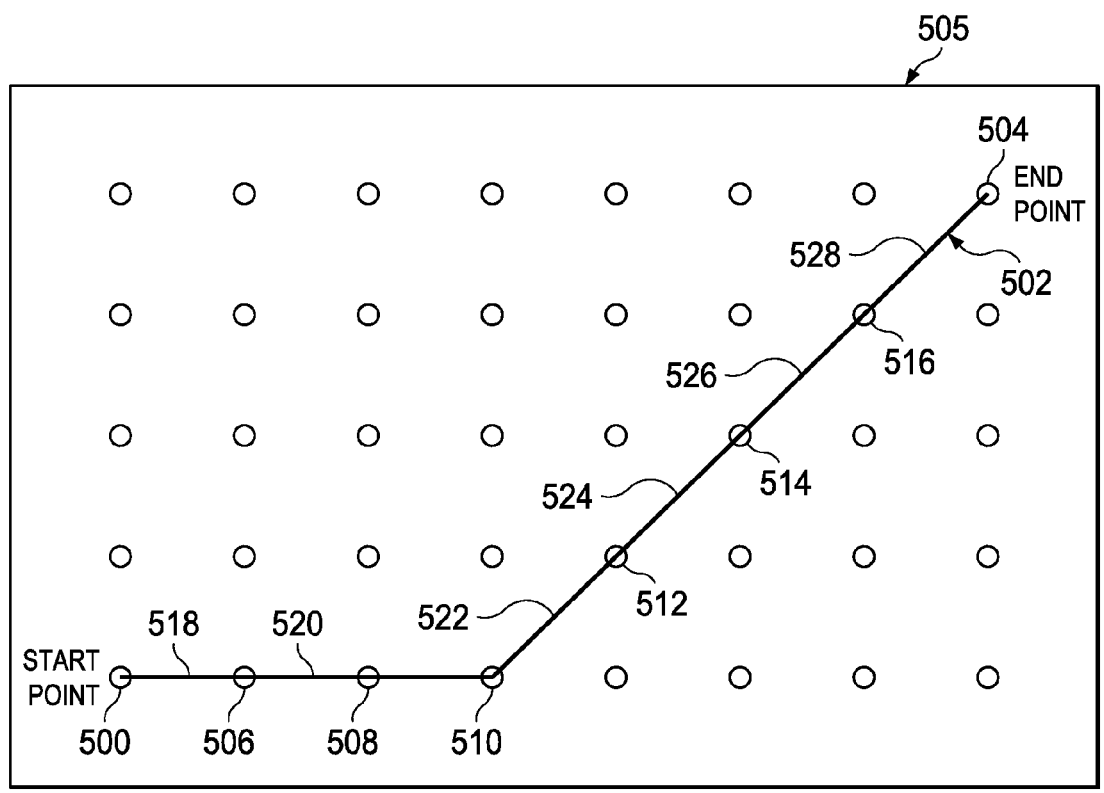
FIG. 5 is an illustration of a route from a start point to an end point for a ship using a routing process in accordance with an advantageous embodiment.

Turning now to FIG. 5, an illustration of a route from a start point to an end point for a ship using a routing process is depicted in accordance with an advantageous embodiment. In this example, the ship begins at start point 500 and follows route 502 to end point 504 in grid 505. Grid 505 is an example of grid 430 in FIG. 4. Route 502 is an example of route 462 in FIG. 4.

Route 502 is generated using a routing process that takes into account forecast conditions, such as weather conditions, waves, currents, and/or other conditions at start point 500, points 506, 508, 510, 512, 514, 516, and end point 504 in grid 505 for route 502. These points define segments 518, 520, 522, 524, 526, and 528. Each segment has a direction and speed for the ship that travels route 502 in these examples.

Figure 6:
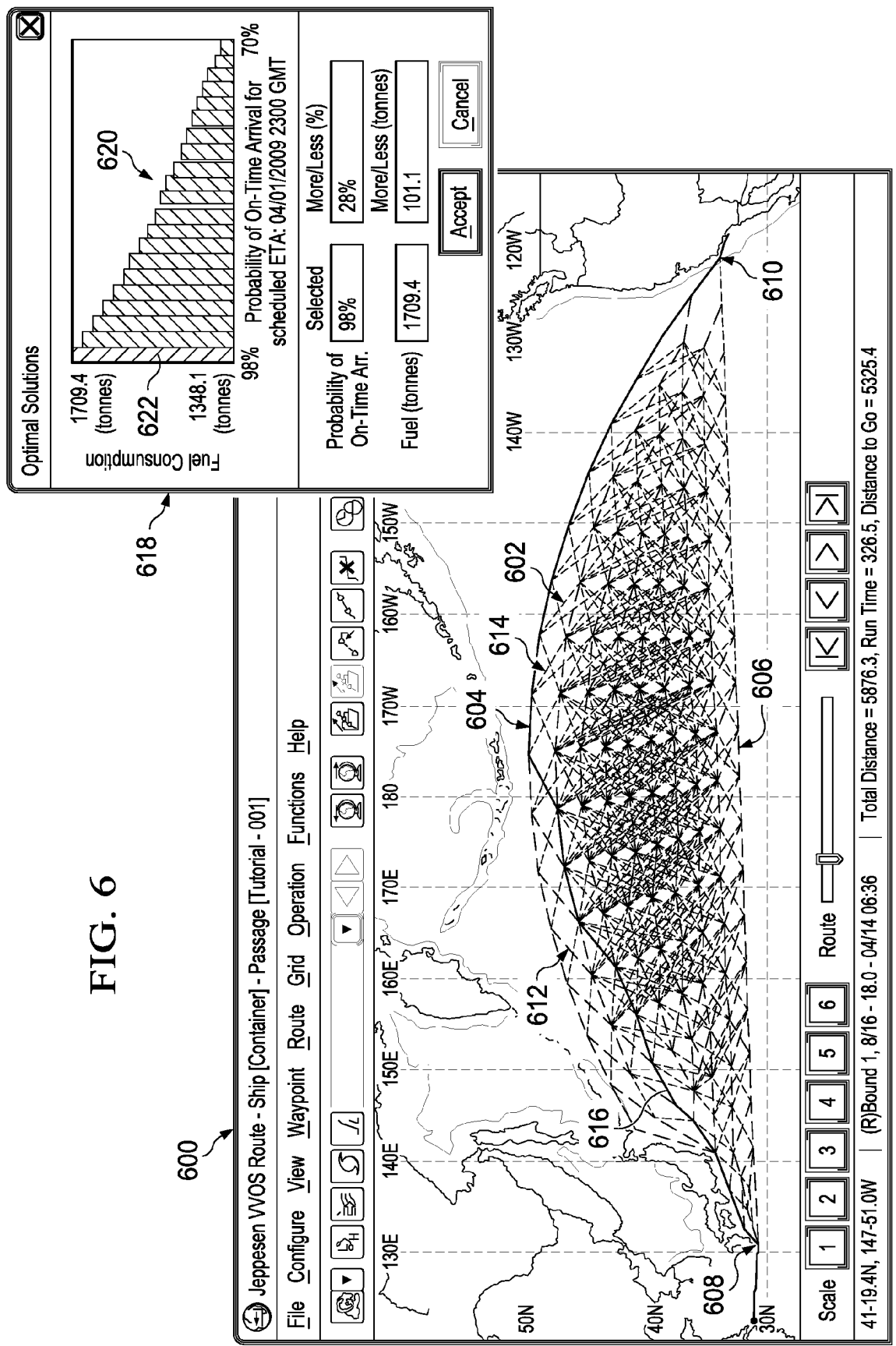
FIG. 6 is a diagram illustrating a presentation of routes in accordance with an advantageous embodiment.

Turning now to FIG. 6, a diagram illustrating a presentation of routes is depicted in accordance with an advantageous embodiment. In this illustrative example, presentation 600 is an example of one implementation of presentation 472 in FIG. 4.

In this example, presentation 600 displays grid of routes 602. Grid of routes 602 is defined by geographical boundary limit 604 and geographical boundary limit 606 from start point 608 to end point 610. In this illustrative example, geographical boundary limits 604 and 606 are examples of maximum geographic limits 428 in FIG. 4.

Grid of routes 602 includes all possible segments of routes for a voyage from start point 608 to end point 610. In this illustrative example, grid of routes 602 includes solution routes 612 and non-solution routes 614. Solution routes 612 are routes that meet user-defined criteria and/or are generated by an optimization process, such as optimization process 406 in FIG. 4.

Non-solution routes 614 are the routes within all possible routes in grid of routes 602 that do not meet the user-defined criteria and/or are not generated as optimal solutions by optimization process 406. In this illustrative example, route 616 is a route solution in solution routes 612 selected by the user.

Additionally, window 618 is present in presentation 600. Window 618 provides an identification of probabilities that are associated with solution routes 612. Bars 620 are presented in window 618. Each bar in bars 620 corresponds to a route in solution routes 612. For example, bar 622 in window 618 corresponds to route 616 in solution routes 612. As indicated beneath bar 622, the probability of arriving on time using route 616 is 98 percent. Further, route 616 corresponds to a fuel consumption of 1,709.4 tons of fuel.

As depicted in this illustrative example in window 618, lower fuel consumption may be provided by choosing a route solution in solution routes 612 with a lower probability of arriving on time. For example, a route solution with a probability of arriving on time of around 70 percent provides a fuel consumption of around 1,350 tons of fuel in this illustrative example.

Figure 7:
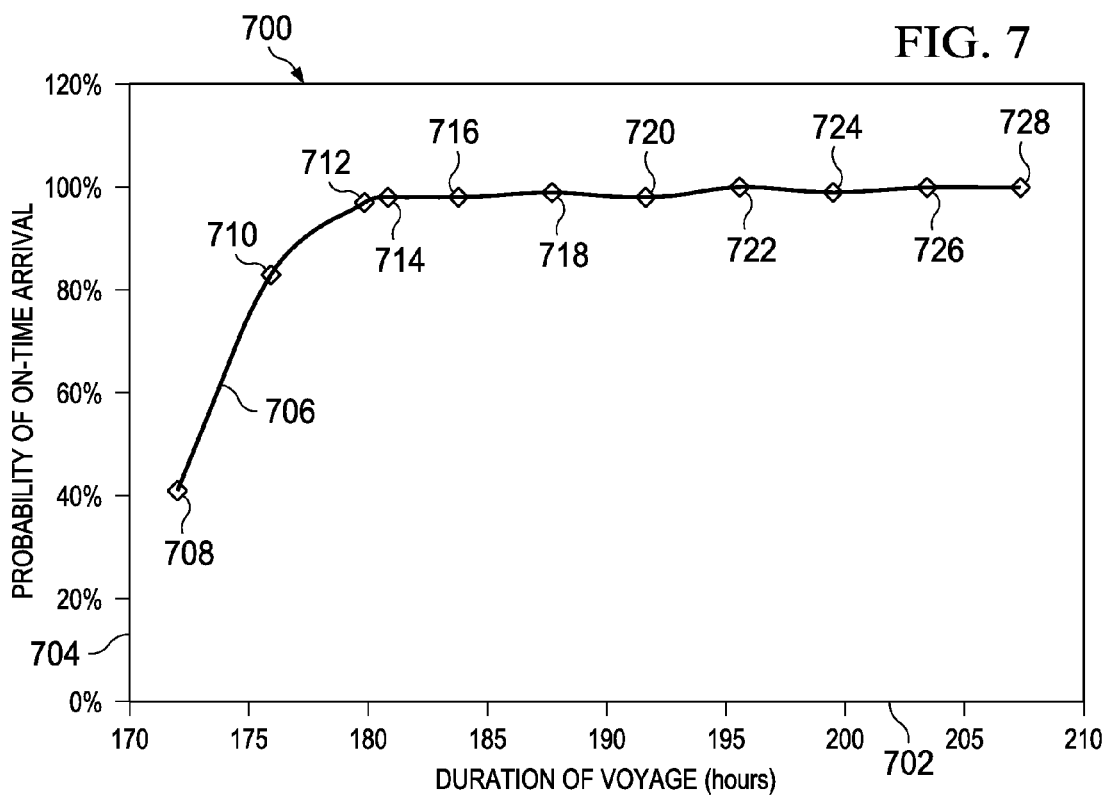
FIG. 7 is a diagram illustrating probabilities of on-time arrival in accordance with an advantageous embodiment.

Turning now to FIG. 7, a diagram illustrating probabilities of on-time arrival is depicted in accordance with an advantageous embodiment. In this example, graph 700 illustrates probabilities of arriving on time during a voyage for a number of different routes.

X-axis 702 illustrates the duration of the voyage, and y-axis 704 illustrates a probability of on-time arrival. Line 706 illustrates a probability of arriving on time during a voyage for a number of routes. In this illustrative example, line 706 provides probabilities for solution routes 612 as presented in window 618 in FIG. 6.

In these illustrative examples, points 708, 710, 712, 714, 716, 718, 720, 722, 724, 726, and 728 are probabilities for different routes within solution routes 612. In this example, point 714 represents route 616 in FIG. 6. Point 714 indicates that route 616 has around a 98 percent probability of arriving on time in a period of time of around 181 hours. In this example, the ship consumes around 1,709.4 tons of fuel.

Figure 8:
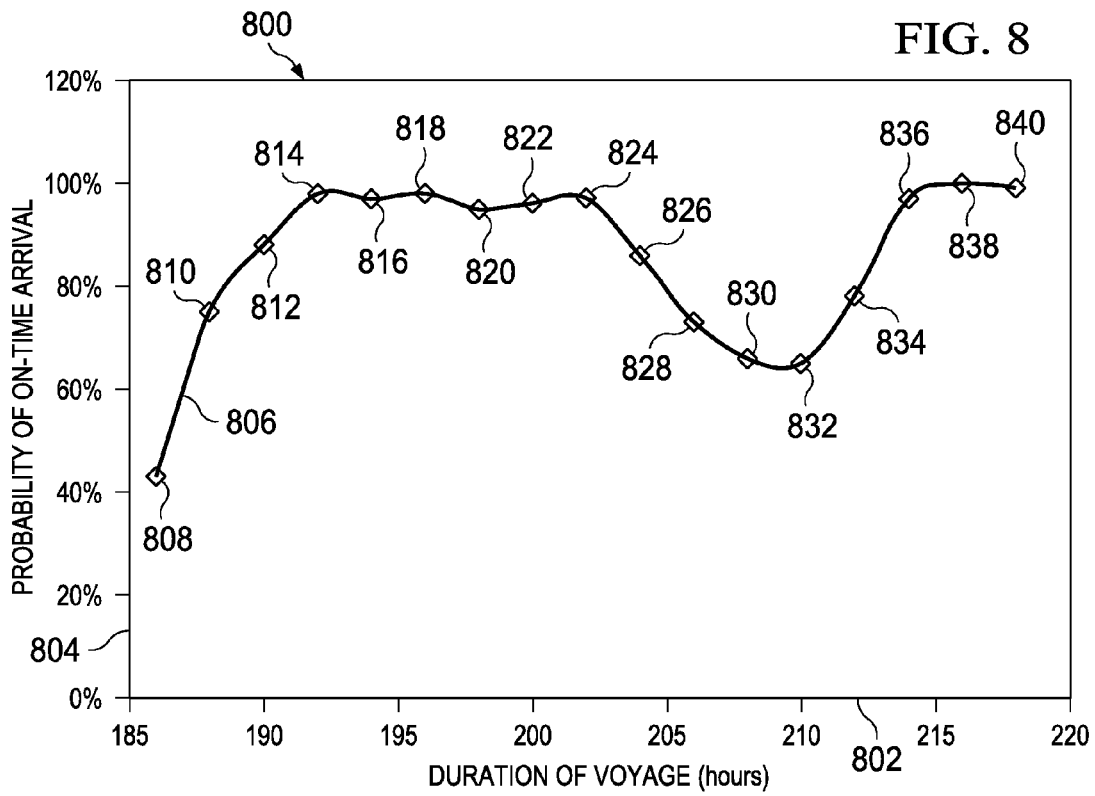
FIG. 8 is a graph illustrating probabilities of arriving on time for a route in accordance with an advantageous embodiment.

Turning now to FIG. 8, a graph illustrating probabilities of arriving on time for a number of routes is depicted in accordance with an advantageous embodiment. In this example, graph 800 illustrates the probability of arriving on time for a number of routes. X-axis 802 is the duration of the voyage. Y-axis 804 is the probability of arriving on time.

Line 806 illustrates the probability of arriving on time during the voyage for a number of routes. These routes may correspond to solution routes 612 in FIG. 6. Points 808, 810, 812, 814, 816, 818, 820, 822, 824, 826, 828, 830, 832, 834, 836, 838, and 840 represent probabilities for completing a voyage on time for different routes. For example, point 826 represents the probability for a route with a duration of around 204 hours. In this example, point 826 indicates that the route has around an 85 percent chance of arriving on time in a period of time of around 204 hours.

As can be seen in this illustrative example, the probability of arriving on time may vary during the voyage. This type of variability in probabilities of arriving on time may be caused by a number of different factors. For example, a fast-moving storm may move across the route of a ship. If the ship speeds up in the earlier part of the voyage, the ship may pass in front of the storm. The following seas may help the ship arrive at its destination more quickly consuming less fuel.

If a ship starts out more slowly, the storm passes in front of the ship. As a result, the passage is slower and consumes more fuel. Further, the volatility of the weather forecast may cause the ship to be caught in the storm and reduce the probability of reaching the end point on time.

As can be seen in these examples, the probabilities for the routes in line 806 are more variable than the probabilities for the routes in line 706. Also, routes with longer durations of voyage do not always have higher probabilities of arriving on time than routes with shorter durations of voyage.

The different advantageous embodiments may be used by different types of operators. Ship operators may use the different advantageous embodiments to plan and execute voyages in a manner that may meet various conditions. These conditions may include, for example, without limitation, reducing fuel consumption, avoiding conditions that may exceed safe operating limits, and reaching an end point on time. With the different routes and probabilities of reaching those routes on time based on the conditions, an operator may choose a particular route based on these factors.

For example, if reaching a destination on time is of the highest priority and weather conditions are highly variable, the operator may choose a route with a higher probability, such as around 98 percent or 99 percent. If reaching the destination on time is a lower priority compared to saving fuel and/or if weather conditions are stable, the operator may choose a route that has a probability of around 85 percent to around 95 percent. Further, routes may be recalculated during the passage of the voyage along the route initially selected to choose new routes from the current location or continue on the same route.

The different advantageous embodiments also may be used by port managers. By knowing the probability that ships may arrive on time in ports, a port manager can more accurately organize and schedule resources. The scheduling of these resources may take into account that changes in arrival times may be reduced as compared to current situations. This type of management may reduce the amount of time that a ship is in port. Also, the reduction of fuel consumption and emission of pollutants also may be reduced. This type of reduction may be especially important for sensitive coastal environments. Port managers may obtain updated arrival times by communicating with ship owners or operators. In some cases, this information may be provided directly to the port managers.

Further, some advantageous embodiments may be used by freight logistics management companies. Freight logistics companies may obtain more accurate arrival times of ships, as well as probabilities that those ships arrive on time using the different advantageous embodiments. With this information, freight logistic management companies may more accurately allocate resources. The different advantageous embodiments, of course, may be used by yet other types of operators, depending on the particular implementation.

Figure 9:
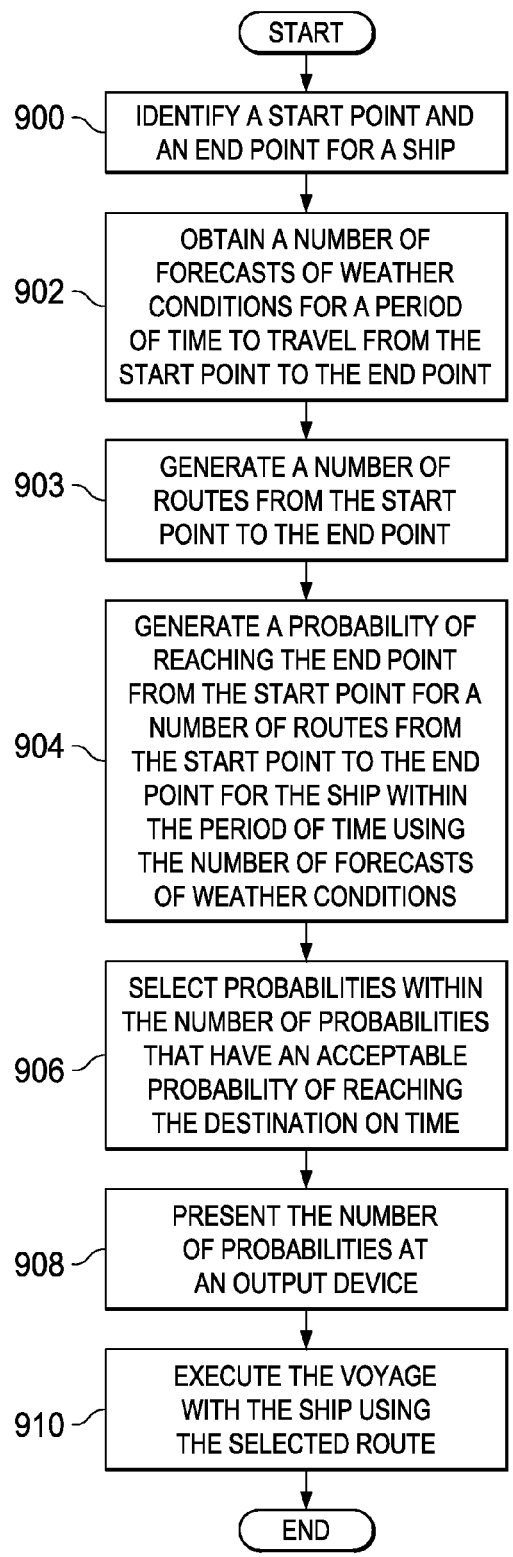
FIG. 9 is a flowchart of a process for generating a route for a ship in accordance with an advantageous embodiment.

Turning now to FIG. 9, a flowchart of a process for generating a route for a ship is depicted in accordance with an advantageous embodiment. The process illustrated in FIG. 9 may be implemented using route analysis and planning tool 400 in FIG. 4.

In this illustrative example, the process begins by identifying a start point and an end point for a ship (operation 900). The process then obtains a number of forecasts of weather conditions for a period of time to travel from the start point to the end point (operation 902). The number of forecasts may comprise an ensemble weather forecast that includes weather forecasts, as well as wave, tide, and wind forecasts.

The process then generates a number of routes from the start point to the end point (operation 903). Operation 903 generates the number of routes as a subset of all possible routes from the start point to the end point. The number of routes may be generated using optimization process 406 in route analysis and planning tool 400 in FIG. 4. Operation 903 may take into account factors such as, for example, without limitation, weather forecasts, safety constraints, maximum speed, a desired level of fuel efficient, and/or other factors.

A probability of reaching the end point from the start point is generated for a number of routes from the start point to the end point for the ship within the period of time using the number of forecasts of weather conditions (operation 904). A number of probabilities are formed by operation 904. These probabilities may be generated by probability process 408 in route analysis and planning tool 400 in FIG. 4.

In these illustrative examples, the probability in operation 904 may be calculated as the product of the probabilities of the individual links from start to end points. For example, $P=P_1*P_2*P_3*P_4 \ldots P_n$ for n such links. $P_i$ is the probability that the ship can make the speed and heading under the forecast characterized by the mean wave height and standard deviation, subjected to the constraints that the safe operating limits are not exceeded and the ship has enough horsepower to overcome the resistance. The probability is estimated by the cumulative probability that the ship can make the speed up to the maximum wave height, Hmax, based on the type of probability distribution and parameters derived from the output of ensemble forecast models.

The generation of the probability also may take into account other factors in operation 904. For example, a model of a ship also may be used. Other conditions such as, for example, currents, tides, and/or other events, also may be taken into account in generating the number of probabilities.

The process may then select probabilities within the number of probabilities that have an acceptable probability of reaching the destination on time (operation 906). This operation may, for example, select probabilities from the number of probabilities that have around a 70 percent chance or better probability of reaching the end point on time. The number of probabilities may then be presented at an output device (operation 908).

The process may then execute the voyage with the ship using the selected route (operation 910), with the process terminating thereafter. The process in FIG. 9 may be repeated any number of times to update the route with a new start point to the same end point. The new start point is the current point of the ship when the process is re-initiated in these examples.

Figure 10:
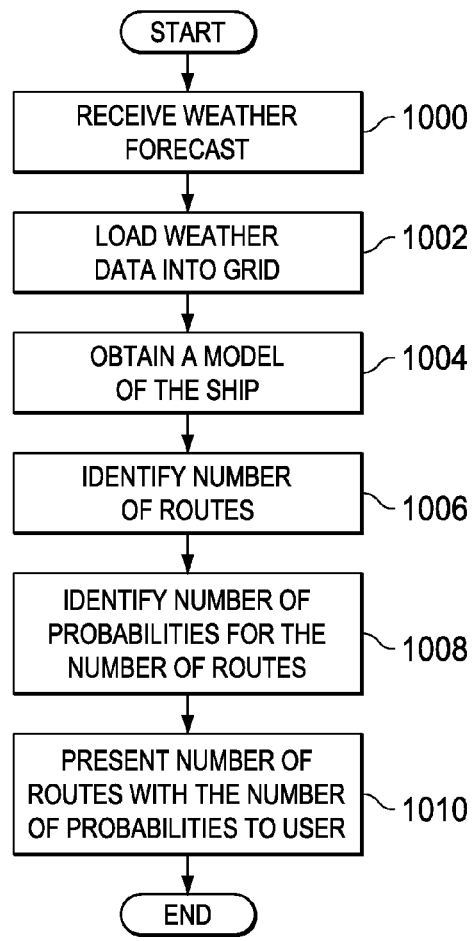
FIG. 10 is a flowchart of a process for generating a route for a vessel in accordance with an advantageous embodiment of the present invention.

With respect to FIG. 10, a flowchart of a process for generating a route for a ship is depicted in accordance with an advantageous embodiment. The process illustrated in FIG. 10 may be implemented using a routing process, such as that found in route analysis and planning tool 400 in FIG. 4.

The process begins by receiving a weather forecast (operation 1000). In the illustrative embodiments, the weather forecast includes a forecast of wave conditions over the different areas of interest. Additionally, the weather forecast also may include a forecast of wind conditions in addition to or in place of the wave conditions.

Next, weather data is loaded into an optimization grid (operation 1002). The weather data for each point on the grid may include a forecast of weather conditions over a period of time. For example, each point may be associated with a forecast of weather conditions for a 10-day period of time.

The grid used in operation 1002 is a grid used by the routing process to generate a number of routes. The grid may be, for example, grid 505 in FIG. 5. Weather forecasts are received as grid data sets for this grid. In these examples, the weather forecast received covers the area of interest. A grid set is present for every grid point in time in the forecast data that is received. For example, the different grid sets may be 4-hour increments for the same area. In other words, one grid may be present for current conditions with a second grid being present for forecasted conditions 4 hours from the current time.

Another grid of forecasted data is present for conditions 8 hours from the current time. This data is re-sampled or placed into the optimization grid by the routing process for different points in time in routing a ship. In these examples, each grid point in the optimization grid has a list of wave parameters sorted by forecast time. As a result, an entry in a list is present for each forecasted time slot for a particular grid point. In these examples, wave parameters are considered constant over the entire grid square for a given point in time for a particular grid point.

The process then obtains a model of the ship (operation 1004). Next, a number of routes are identified (operation 1006). If the number of routes is a single route, the optimal or best route is identified. In these examples, the optimal route is a route that will allow the ship to travel from the start point to the end point while meeting constraints and that has the highest probability of reaching the end point on time. These constraints may include, for example, speed, fuel consumption, and/or other conditions. Operation 1006 may be performed using any currently available routing process. A number of probabilities are identified for the number of routes (operation 1008).

The number of routes and the number of probabilities are then presented to a user (operation 1010), with the process terminating thereafter. At this point, the user may decide whether to use the suggested route. Of course, depending on the implementation, the optimal route may be automatically implemented into a navigation system for the ship without user intervention.

Figure 11:
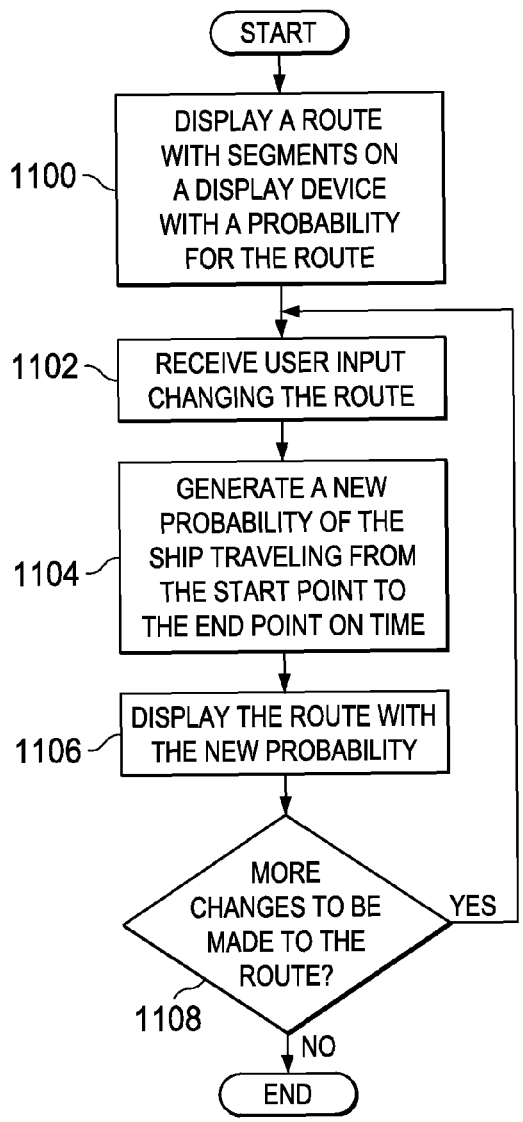
FIG. 11 is a flowchart of a process for identifying changes to probabilities for a route in accordance with an advantageous embodiment.

Turning now for FIG. 11, a flowchart of a process for identifying changes to probabilities for a route is depicted in accordance with an advantageous embodiment. The process illustrated in FIG. 11 may be implemented in routing analysis and planning tool 400 in FIG. 4. This process may be performed on a route presented to an operator or selected by an operator.

The process begins by displaying a route with segments on a display device with a probability for the route (operation 1100). This display may include the probability for the entire route and the probability for each segment.

The process then receives user input changing the route (operation 1102). The change may be, for example, a change to a number of the segments. For example, the speed of the ship in one segment may be changed. As another example, the speed of the ship through all of the segments may be changed. The change may set different speeds for the different segments in the route, set a uniform speed for all of the segments, and/or make some other change.

In another illustrative example, the change may be the period of time for the route. For example, the period of time may be changed from 180 hours to 170 hours. The change also may be to a heading or an addition of another segment in the route for the ship.

Based on the change, the process generates a new probability of the ship traveling from the start point to the end point on time (operation 1104). The process then displays route with the new probability (operation 1106).

A determination is made as to whether more changes are to be made to the route (operation 1108). If more changes are to be made, the process returns to operation 1102. Otherwise, the process terminates.

Figure 12:
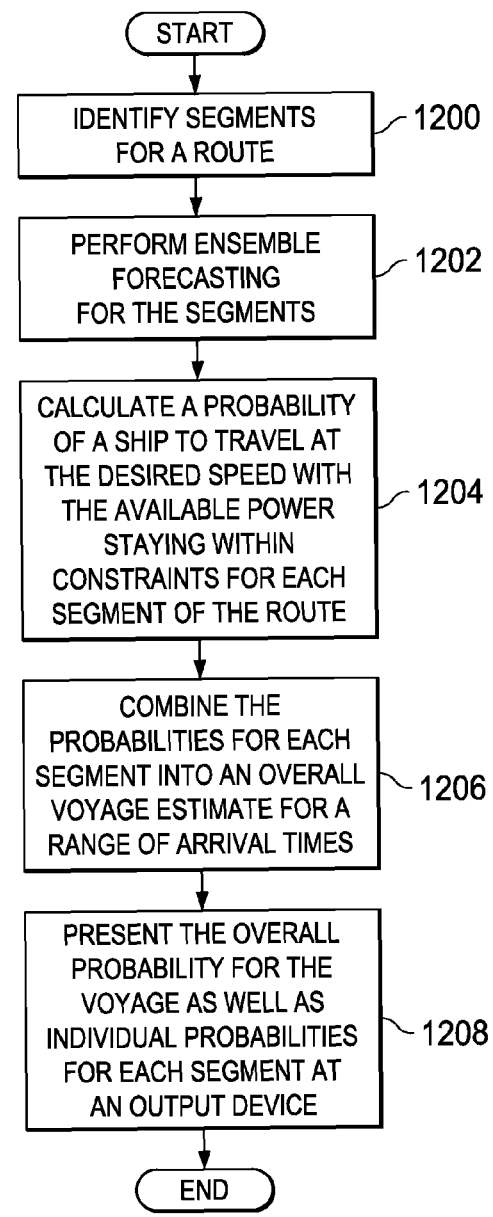
FIG. 12 is a process for identifying a probability for a route in accordance with an advantageous embodiment.

Turning now to FIG. 12, a process for identifying a probability for a route is depicted in accordance with an advantageous embodiment. The process illustrated in FIG. 12 may be implemented in a software component such as, for example, route analysis and planning tool 400 in FIG. 4.

The process begins by identifying segments for a route (operation 1200). Operation 1200 may involve dividing a route into a number of segments. In other advantageous embodiments, segments on a grid may be selected to form a route. Ensemble forecasting is then performed for the segments (operation 1202).

The process then calculates a probability of a ship to travel at the desired speed with the available power staying within constraints for each segment of the route (operation 1204). These constraints may include safe operating limits, desired fuel consumption, and/or other information. The process then combines the probabilities for each segment into an overall voyage estimate for a range of arrival times (operation 1206).

The overall probability for the voyage, as well as individual probabilities for each segment, may be presented at an output device (operation 1208), with the process terminating thereafter. These probabilities may be presented in a form, such as those shown in graph 700 in FIG. 7 and graph 800 in FIG. 8.

Figure 13:
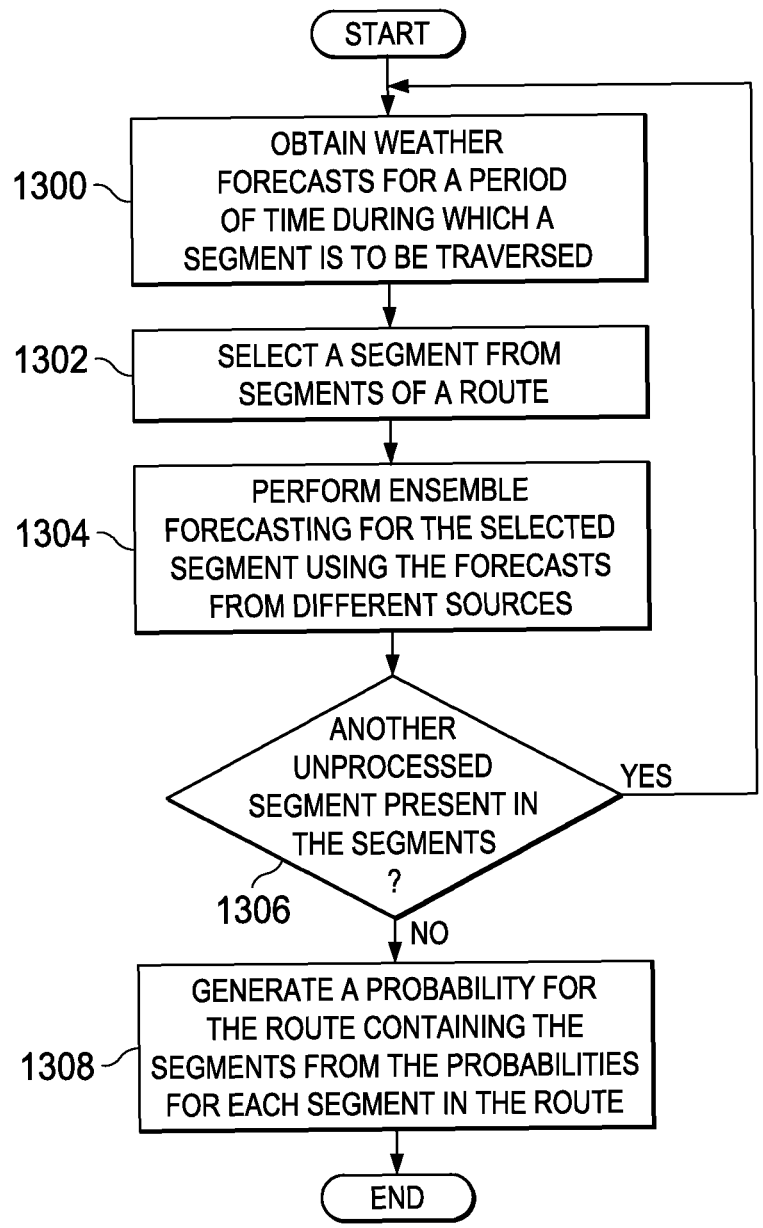
FIG. 13 is a flowchart of a process for performing ensemble forecasting for weather conditions in accordance with an advantageous embodiment.

Turning now to FIG. 13, a flowchart of a process for performing ensemble forecasting for weather conditions is depicted in accordance with an advantageous embodiment. The process illustrated in FIG. 13 is a more detailed illustration of a process that may be implemented for operation 1202 in FIG. 12.

The process begins by obtaining weather forecasts for a period of time during which a segment is to be traversed (operation 1300). A segment is selected from segments of a route (operation 1302). Ensemble forecasting is then performed for the selected segment using the forecasts from the different sources (operation 1304). In these illustrative examples, ensemble forecasting is a numerical prediction method used to generate a representative sample of feature states, such as weather conditions.

For example, around 50 sources may be used to obtain forecasts for a particular segment to be traveled during a route during a particular period of time. These forecasts may provide different events. For example, some forecasts may forecast a storm, other forecasts may forecast clear conditions, and yet other forecasts may forecast high winds.

These different forecasts may be analyzed to generate a probability of a certain event occurring. This event may be, for example, a storm, clear conditions, high winds, and/or other events. In other words, an ensemble weather forecast may include a number of forecasts for a number of weather phenomena such as, for example, without limitation, weather conditions, winds, waves, tides, currents, and/or other suitable phenomena. Further, past forecasts and observations also may be used with these forecasts to increase the reliability.

A determination is made as to whether another unprocessed segment is present in the segments (operation 1306). If another unprocessed segment is present, the process returns to operation 1300. Otherwise, a probability for the route containing the segments is generated from the probabilities for each segment in the route (operation 1308), with the process terminating thereafter.

Figure 14:
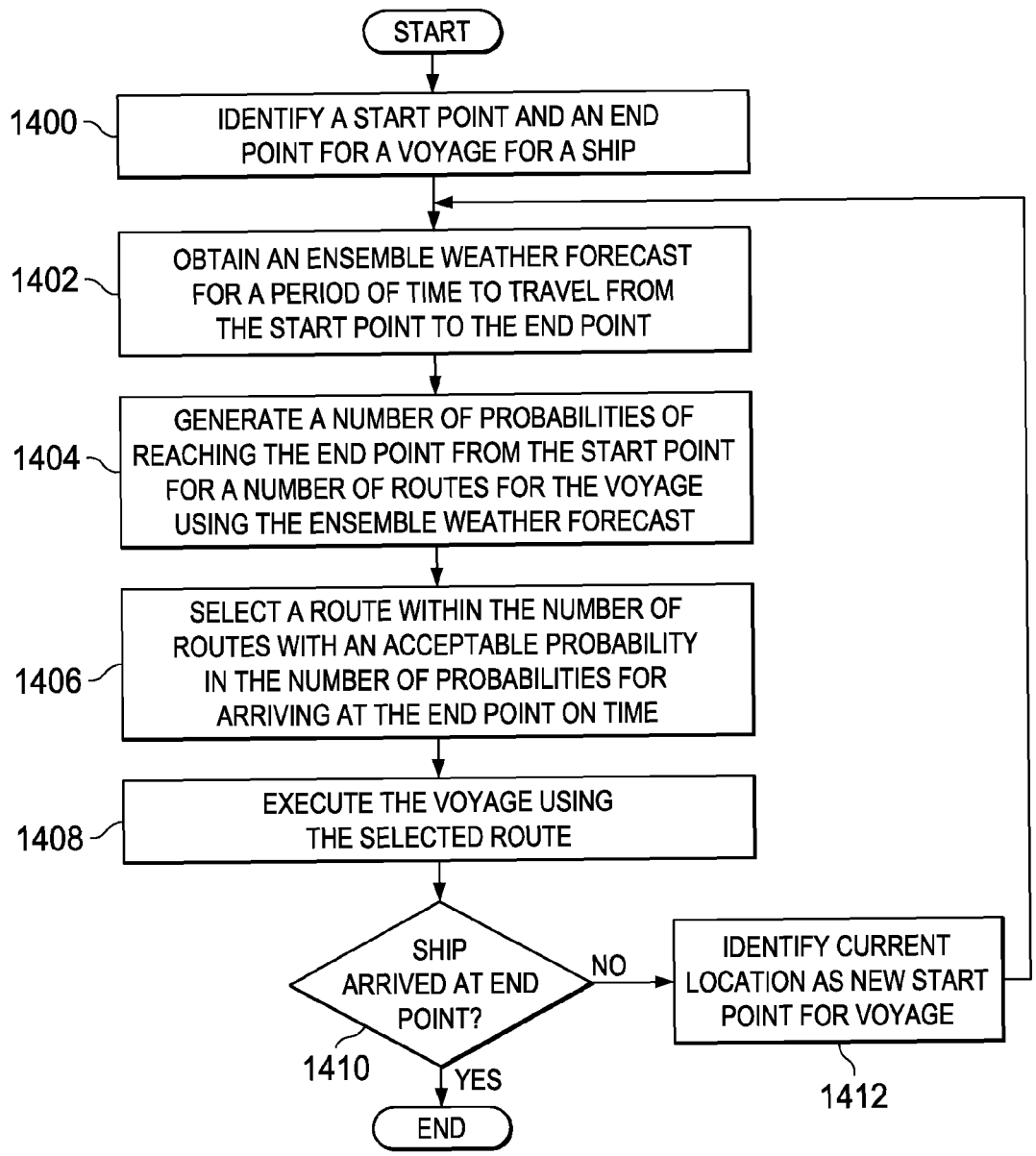
FIG. 14 is a flowchart of a process for generating revised routes for a ship during a voyage in accordance with an advantageous embodiment.

With respect to FIG. 14, a flowchart of a process for generating revised routes for a ship during a voyage is depicted in accordance with an advantageous embodiment. The process illustrated in FIG. 14 may be implemented using a routing process, such as that found in route analysis and planning tool 400 in FIG. 4.

The process begins by identifying a start point and an end point for a voyage for a ship (operation 1400). The process then obtains an ensemble weather forecast for a period of time to travel from the start point to the end point (operation 1402). A number of probabilities of reaching the end point from the start point for a number of routes for the voyage are generated using the ensemble weather forecast (operation 1404).

Thereafter, the process selects a route within the number of routes with an acceptable probability in the number of probabilities for arriving at the end point on time (operation 1406). The process then executes the voyage using the selected route (operation 1408).

During the voyage, a determination is made as to whether the ship has arrived at the end point (operation 1410). If the ship has arrived at the end point, the process then terminates. Otherwise, the process identifies the current location of the ship as the new start point for the voyage (operation 1412). The process then returns to operation 1402, as described above, using the new start point identified in operation 1412. In this manner, a selected route for a voyage may be revised a number of times during a voyage to take into account different ensemble weather forecasts that are generated for different periods of time during the voyage.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for generating a route for a ship, the method comprising:
    identifying, by a processor unit, a start point and an end point for travel by sea for of the ship and a period of time for travelling between the start point and the end point;
    generating a route by sea between the start point and the end point;
    dividing the route by sea between the start point and the end point into a plurality of segments;
    calculating, by a processor unit, a segment probability for travel of the ship at a desired speed for each segment in the plurality of segments for the route using navigation information from a navigation database and forecasting information to form a plurality of segment probabilities for the route, wherein the forecasting information comprises data identifying forecasted conditions for the plurality of segments selected from the group of conditions consisting of weather conditions, currents, waves, and tides;
    multiplying the plurality of segment probabilities together to form a route probability for the ship reaching the end point from the start point within the period of time;
    repeating the steps of generating a route, dividing the route into a plurality of segments, calculating a segment probability for travel of the ship at a desired speed for each segment in the plurality of segments to form a plurality of segment probabilities, and multiplying the plurality of segment probabilities together to form a route probability for the ship reaching the end point from the start point within a period of time for a plurality of different routes between the start point and the end point to form a plurality of route probabilities;
    generating, by a processor unit, a graphical display and displaying at the same time on a graphic output device, the plurality of route probabilities of the ship reaching the end point from the start point within a period of time for the plurality of different routes; and
    selecting the route for the ship from the plurality of different routes having a route probability from the plurality of route probabilities that is an acceptable probability of the ship reaching the end point from the start point within a period of time.

2. The method of claim 1 further comprising:
    responsive to a change to the route during travel, identifying a new probability for the route based on the change to the route.

3. The method of claim 2, wherein the change is selected from at least one of a change in the desired speed for at least one segment in the route and a change in the period of time.

4. The method of claim 2, wherein identifying a new probability for the route based on the change to the route comprises:
    responsive to the change to the route, generating the route, dividing the route into a plurality of segments, calculating a segment probability for travel of the ship at the desired speed for each segment in the plurality of segments to form a plurality of segment probabilities, and multiplying the plurality of segment probabilities together
    to form the new probability for the route.

5. The method of claim 1, wherein the step of calculating the segment probability for the each segment in the plurality of segments for the route further comprises:
    calculating a probability of the forecasted weather conditions for the each segment in the plurality of segments for the route being correct.

6. The method of claim 5, wherein the probability of the forecasted weather conditions for the each segment in the plurality of segments for the route being correct is calculated using ensemble weather forecasting.

7. The method of claim 1, wherein the step of
    calculating the segment probability for travel of the ship at the desired speed for each segment in the plurality of segments for the route further comprises using a model of the ship to form the segment probability, the model of the ship including safe operating limits of the ship.

8. The method of claim 1 further comprising:
    performing a voyage with the ship using the route selected from the plurality of different routes.

9. The method of claim 7, wherein the model of the ship comprises at least one of a maximum speed, a fuel consumption, a loading of the ship, engine power characteristics, a ship hull design, a number of propeller curves, and a ship draft.

10. The method of claim 1 further comprising:
    generating a route, dividing the route into a plurality of segments, calculating a segment probability for travel of the ship at a desired speed for each segment in the plurality of segments to form a plurality of segment probabilities, and multiplying the plurality of segment probabilities together to form a route probability for the ship reaching the end point from the start point within the period of time in response to an event.

11. The method of claim 10, wherein the event is a change in the forecasted weather conditions.

12. The method of claim 1 further comprising:
generating the plurality of different routes from the start point to the end point using a number of conditions and an optimization process.

13. An apparatus comprising:
a computer recordable storage device;
a program code stored on the computer recordable storage device; and
a processor unit that executes the program code and causes the apparatus to identify a startpoint and an end point for travel by sea of a ship and a period of time for travelling between the start point and the end point; generate a route by sea between the start point and the end point; divide the route by sea between the start point and the end point into a plurality of segments; calculate a segment probability for travel of the ship at a desired speed for each segment in the plurality of segments for the route using navigation information from a navigation database and forecasting information to form a plurality of segment probabilities for the route, wherein the forecasting information comprises data identifying forecasted conditions for the plurality of segments selected from the group of conditions consisting of weather conditions, currents, wave, and tides; multiply the plurality of segment probabilities together to form a route probability for the ship reaching the end point from the start point within the period of time; repeat the steps of generating a route, dividing the route into a plurality of segments, calculating a segment probability for travel of the ship at a desired speed for each segment in the plurality of segments to form a plurality of segment probabilities, and multiplying the plurality of segment probabilities together to form a route probability for the ship reaching the end point from the start point within the period of time for a plurality of different routes between the start point and the end point to form a plurality of route probabilities; generate a graphical display on a graphic output device displaying at the same time the plurality of route probabilities of the ship reaching the end point from the start point within the period of time for the plurality of different routes; and select the route for the ship from the plurality of different routes having a route probability from the plurality of route probabilities that is an acceptable probability of the ship reaching the end point from the start point within the period of time.

14. The apparatus of claim 13, wherein in executing the program code to calculate the segment probability, the processor unit executes the program code to calculate the segment probability using a model of the ship, the model of the ship including safe operating limits of the ship.

15. The apparatus of claim 14, wherein in executing the program code to calculate the segment probability, the processor unit executes the program code to calculate the segment probability using the forecasting information identifying forecasted weather conditions, the model of the ship, and the forecasting information identifying forecasted waves.

16. The apparatus of claim 13, wherein the processor unit further executes the program code to display the plurality of different routes in association with the plurality of route probabilities on the graphic output device.

17. The apparatus of claim 14, wherein the model of the ship comprises at least one of a maximum speed, a fuel consumption, a loading of the ship, engine power characteristics, a ship hull design, a number of propeller curves, and a ship draft.

18. The apparatus of claim 13, wherein the computer recordable storage device and the processor unit are disposed on the ship.

19. The apparatus of claim 13, wherein the computer recordable storage device and the processor unit are located in a home office.

20. A computer program product that generates a route for a ship, the computer program product comprising:
a non-transitory computer recordable storage medium;
program code, stored on the computer recordable storage medium, that when executed identifies a start point and an end point for a the ship and a period of time for travelling between the start point and the end point;
program code, stored on the computer recordable storage medium, that generates a route between the start point and the end point;
program code, stored on the computer recordable storage medium, that divides the route between the start point and the end point into a plurality of segments;
program code, stored on the computer recordable storage medium, that calculates a segment probability for each segment in the plurality of segments for the route using navigation information from a navigation database and forecasting information to form a plurality of segment probabilities for the route, wherein the forecasting information comprises data identifying forecasted conditions for the plurality of segments selected from the group of conditions consisting of weather conditions, currents, waves, and tides;
program code, stored on the computer recordable storage medium, that multiplies the plurality of segment probabilities together to form a route probability for the route;
program code, stored on the computer recordable storage medium, that repeats the steps of generating a route, dividing the route into a plurality of segments, calculating a segment probability for each segment in the plurality of segments to form a plurality of segment probabilities, and multiplying the plurality of segment probabilities together to form a route probability for a plurality of different routes between the start point and the end point to form a plurality of route probabilities;
program code, stored on the computer recordable storage medium, that generates a graphical display on a graphic output device displaying at the same time the plurality of route probabilities of the ship reaching the end point from the start point for the plurality of different routes within the period of time; and
program code, stored on the computer recordable storage medium, that selects the route for the ship from the plurality of different routes having a route probability from the plurality of route probabilities that is an acceptable probability of reaching the end point from the start point within the period of time.

21. The computer program product of claim 20, wherein the program code, stored on the computer recordable storage medium, that calculates the segment probability for the each segment in the plurality of segments for the route comprises:
program code, stored on the computer recordable storage medium, that calculates a probability of the forecasted weather conditions for the each segment in the plurality of segments for the route being correct.

22. The computer program product of claim 21, wherein the probability of the forecasted weather conditions for the each segment in the plurality of segments for the route being correct is calculated using ensemble weather forecasting.

* * * * *